Figure 1:
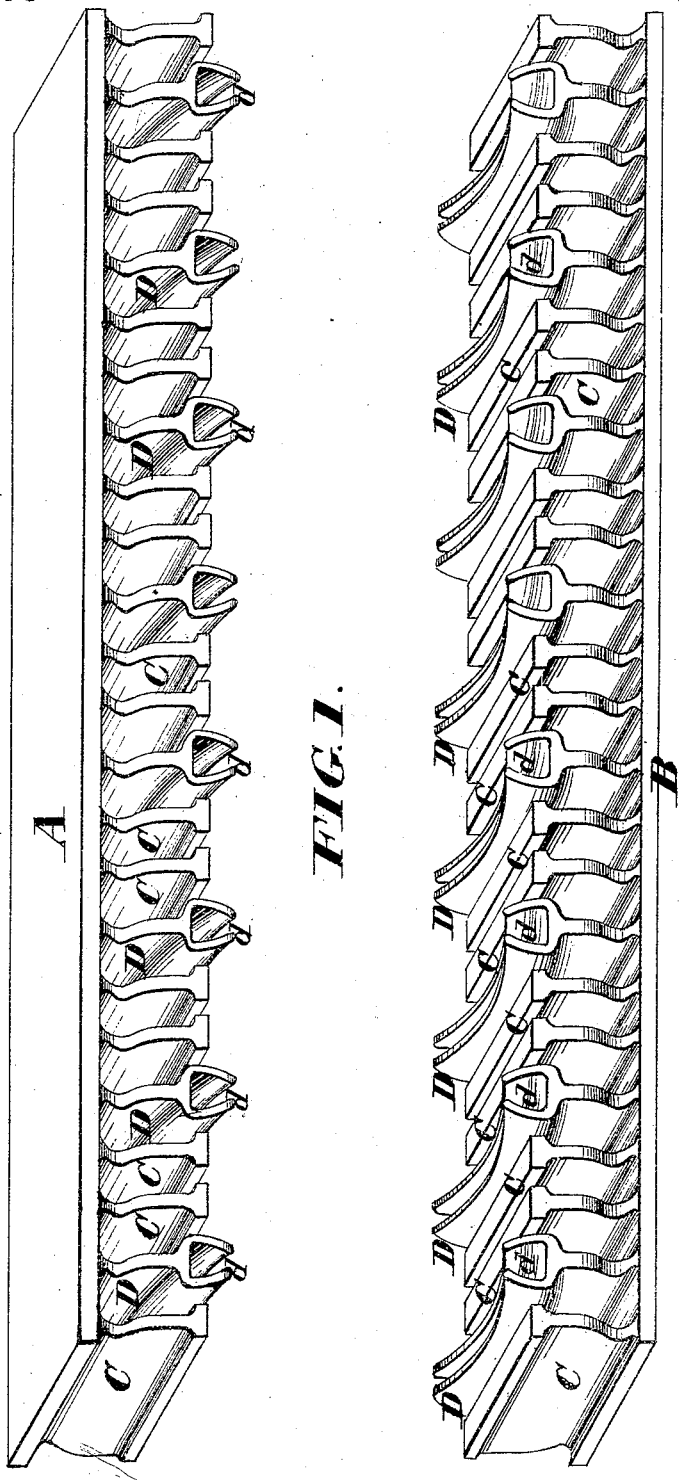

G. W. GRADER.
Cotton and Hay-Presses.

No. 153,333. Patented July 21, 1874.

WITNESSES
Jas. L. Ewin
Walter Allen

INVENTOR
George W. Grader
By Knight Bro, Attorneys

2 Sheets--Sheet 2.
G. W. GRADER.
Cotton and Hay-Presses.
No. 153,333. Patented July 21, 1874.
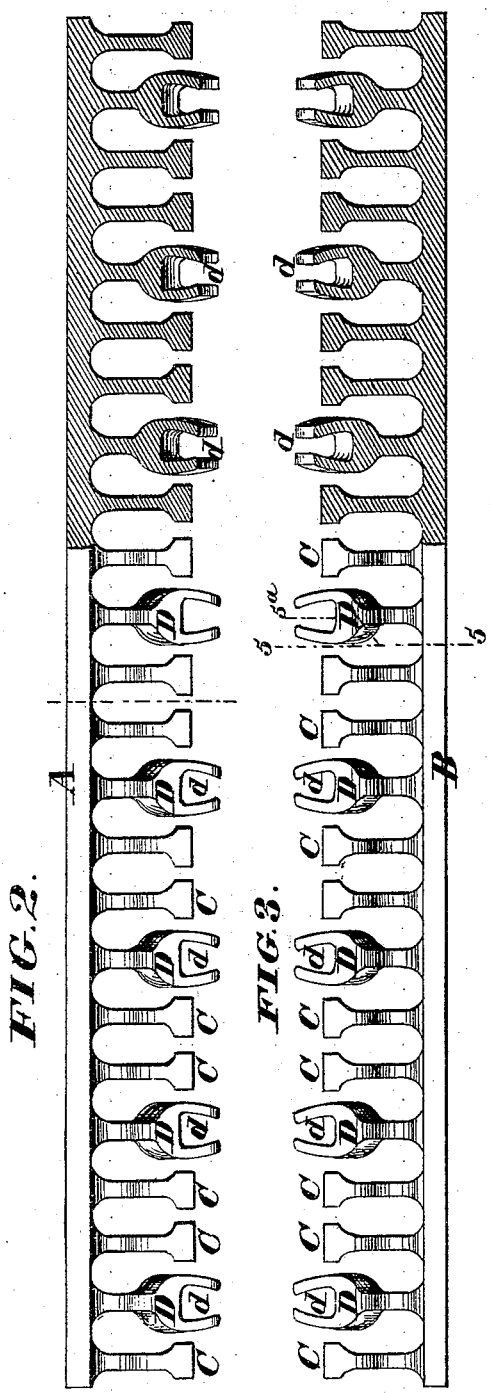
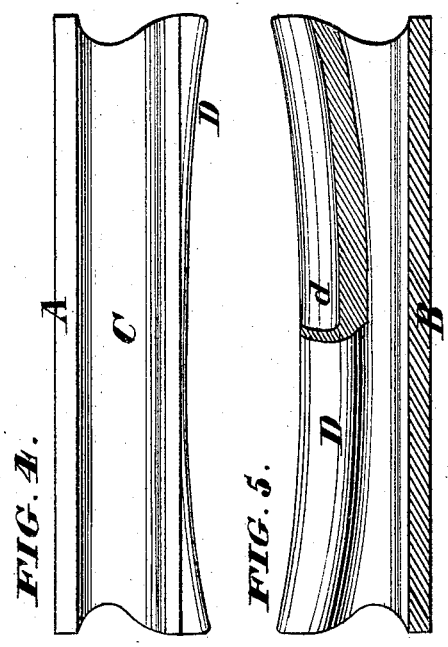
WITNESSES
Jas. L. Ewin
Walter Allen
INVENTOR
George W. Grader
By Knight Bro. Attorneys

UNITED STATES PATENT OFFICE.

GEORGE W. GRADER, OF MARBLEHEAD, MASSACHUSETTS.

IMPROVEMENT IN COTTON AND HAY PRESSES.

Specification forming part of Letters Patent No. 153,333, dated July 21, 1874; application filed June 22, 1874.

*To all whom it may concern:*

Be it known that I, GEORGE W. GRADER, of Marblehead, in the county of Essex and State of Massachusetts, have invented a new and useful Improvement in Cotton and other Presses, of which the following is a specification:

My invention is intended to reduce the expansion and change in form of bales when released from the press. To this end I construct the platen with supplemental ribs, extending beyond the ordinary working face of the ribs, and, preferably, concave in outline. The ties are applied within grooves prepared therefor in the faces of these supplemental ribs, or between pairs of such ribs.

In the accompanying drawings, Figure 1 is a perspective view of a pair of platens illustrating this invention. Figs. 2 and 3 are front elevations, partly in section, of the upper and lower platens, respectively. Fig. 4 is an elevation of the upper platen. Fig. 5 is a transverse section, partly on the line 5 5, and partly on the broken line 5 5ª, Fig. 3.

A and B represent the platens of a cotton-press, each formed with ordinary ribs C C, which have straight faces, and, at intervals, with supplemental ribs D, having concave faces projecting beyond the faces of the straight ribs, as shown. In the faces of these ribs I prefer to form grooves $d$, for the reception of the ties.

It is manifest that, instead of constructing the curved ribs with grooved faces, they may be arranged in pairs, projecting beyond bearing-surfaces of the customary ribs C, so as to receive the ties between them.

In compressing cotton with flat-faced platens of common construction, the bales require a greatly-flattened and substantially rectangular form, being pressed equally all over. In this condition they receive the ties. The consequence is, that when the pressure is removed the bale expands, so as to draw the ties into elliptical form, causing them to become embedded in the yielding corners of the bale. The bale gradually expands still farther, by swelling and bulging between the ties—an effect which is permitted by the stretching of the bagging. The consequence of all this expansion is, the loss of the last few inches of compression, which are necessarily applied to the bale with the greatest expenditure of power.

The projecting ribs on my improved platens are for the purpose of compressing those parts of the bale that come directly in contact with the ties to a sufficient solidity to prevent the tie from embedding itself farther in the bale when the power of the press is taken off. This enables me to bale four inches, while the general surfaces of the platens are eight inches apart, whereby I save the power which would have been necessary to bring the whole bale down to four inches. The device also stretches the bagging in such a manner as to cause it to form a lateral tie between the encircling ties of the bale, and thereby prevents the expansion of the baled material between the ties when removed from the press.

The following is claimed as new:

1. The bars D D, projecting beyond the general bearing-surface of the customary ribs C C, substantially as herein set forth.

2. The grooves $d$, formed in the bearing-faces of the projecting bars, substantially as and for the purposes set forth.

In testimony of which invention I hereunto set my hand this 9th day of May, 1874.

GEO. W. GRADER.

Witnesses:
 OCTAVIUS KNIGHT,
 WALTER ALLEN.